US006769915B2

(12) United States Patent
Murgia et al.

(10) Patent No.: US 6,769,915 B2
(45) Date of Patent: Aug. 3, 2004

(54) INTERACTIVE SYSTEM FOR PERSONAL LIFE PATTERNS

(75) Inventors: Paula J. Murgia, New York, NY (US); Conrad R. Newman, New York, NY (US); Jane N. Dowling, Brooklyn, NY (US); Tory T. Kobayashi, New York, NY (US)

(73) Assignee: Personal Beasties Group, Inc., New York, NY (US)

( * ) Notice: Subject to any disclaimer, the term of this patent is extended or adjusted under 35 U.S.C. 154(b) by 0 days.

(21) Appl. No.: 10/248,580

(22) Filed: Jan. 30, 2003

(65) Prior Publication Data

US 2003/0108850 A1 Jun. 12, 2003

Related U.S. Application Data

(63) Continuation of application No. 09/750,610, filed on Dec. 28, 2000, now abandoned.

(51) Int. Cl.[7] .............................................. G09G 19/00
(52) U.S. Cl. ...................... 434/236; 434/127; 434/238; 434/351
(58) Field of Search ................................ 434/236, 237, 434/238, 351, 127

(56) References Cited

U.S. PATENT DOCUMENTS

| 5,217,379 A | | 6/1993 | Kirschenbaum et al. .... 131/270 |
| 5,377,258 A | * | 12/1994 | Bro ........................ 379/106.02 |
| 5,525,969 A | | 6/1996 | LaDue |
| 5,596,994 A | * | 1/1997 | Bro ............................. 600/545 |
| 5,722,418 A | * | 3/1998 | Bro ............................. 600/545 |
| 5,727,950 A | | 3/1998 | Cook et al. .................. 434/350 |
| 5,813,026 A | | 9/1998 | Borg et al. |
| 5,833,466 A | | 11/1998 | Borg |
| 5,879,163 A | | 3/1999 | Brown et al. ................ 434/236 |
| 5,889,474 A | | 3/1999 | LaDue |
| 5,913,310 A | * | 6/1999 | Brown ........................ 128/897 |
| 5,961,332 A | * | 10/1999 | Joao ............................ 434/236 |
| 5,966,526 A | | 10/1999 | Yokoi |
| 5,967,789 A | | 10/1999 | Segel et al. .................. 434/236 |
| 6,035,288 A | | 3/2000 | Solomon |
| 6,093,158 A | | 7/2000 | Morris |
| 6,151,571 A | * | 11/2000 | Pertrushin .................... 704/209 |
| 6,159,131 A | | 12/2000 | Pfeffer ........................... 482/8 |
| 6,186,145 B1 | | 2/2001 | Brown ........................ 128/897 |
| 6,201,948 B1 | | 3/2001 | Cook et al. .................. 434/350 |
| 6,249,809 B1 | * | 6/2001 | Bro ............................. 709/217 |
| 6,375,469 B1 | | 4/2002 | Brown ........................ 434/236 |

* cited by examiner

Primary Examiner—John Edmund Rovnak
(74) Attorney, Agent, or Firm—Marsteller & Associates, P.C.

(57) ABSTRACT

A user-interactive behavioral modification system (10) includes a base module (12) with an input (14) for a first set of personal data (16). A feedback interface (18) provides feedback in response to the first data set (16). A main database (22) maintains the first data set (16). A main controller (24) generates a main output signal (26) for causing feedback to the user (28) according to a predetermined set of behavioral pattern rules (30). The feedback interface (18) receives a feedback input signal (32) and includes a display (34) for displaying an appearance of a character (36) based on the first set of personal data (16) and in response to the received input signal (32). The appearance of the character (36) is controlled to encourage the user (28) to perform desired behavioral responses according to the behavioral pattern rules (30).

22 Claims, 8 Drawing Sheets

| Situational Factors | Idle | Wake | Upon User Input |
|---|---|---|---|
| Degree of Deviation | High | High | High |
| Time Since Deviation | Low | Low | Low |
| Number of Reactions | None | High | None |
| Disturbances/Relieves | Low | Low | High |
| Non Utility Interactions | High | Low | None |

INTERACTIVE SYSTEM FOR PERSONAL LIFE PATTERNS

CROSS REFERENCE TO RELATED APPLICATIONS

This application is a Continuation of application Ser. No. 09/750,610, filed on Dec. 28, 2000, now abandoned.

BACKGROUND OF INVENTION

1. Technical Field

The invention relates to the field of interactive computer systems, such as interactive Web sites on the Internet and handheld wireless communication devices. In particular, the invention relates to a system and method for promoting desirable user's behavioral pattern in daily life by using distributed computer network such as the Internet and wireless network.

2. Background Art

Computer-aided life management tools such as healthcare/lifestyle assistant software products/services are known. Some of them utilize the Internet (in particular by accessing World Wide Web) to dynamically update data at user's computer. Uploading user progress and downloading expert advices are possible.

Such products/services remain passive tools that much depend on user's commitment to utilize them. In the days when personal handheld wireless devices and embedded network appliances are pervasive, are equipped with sophisticated computation power and user interface, and capable of rich data communication through the Internet, those computer-aided life management tools should help users commit to improve their behaviors. Thus, much more deeply engaging user interactions is needed in order to leverage evolution of personal handheld wireless devices and embedded network appliances in computer-aided life management applications.

U.S. Pat. No. 5,833,466 to Borg discloses a device and method for helping people modify their behavior patterns. However, such a user-interactive device has not been used in the field of remotely controlled devices for an apparatus for transmitting information over a wireless communications network. There are numerous reasons for this nonuse.

While the above-cited references introduce and disclose a number of noteworthy advances and technological improvements within the art, none completely fulfills the specific objectives achieved by this invention.

SUMMARY OF INVENTION

In accordance with the present invention, a user-interactive behavioral modification system for modifying undesired behavioral patterns includes a base module with an input means for inputting a first set of personal data by a user into the base module. A feedback interface provides feedback or operatively controls other modules or devices in response to the first set of personal data.

A main database component maintains the first set of personal data entered into the base module. A main controller unit generates a main output signal for causing feedback to the user according to a predetermined set of behavioral pattern rules. The feedback interface receives a feedback input signal and preferably includes a display unit for displaying an appearance of a character having different appearances based on the first set of personal data and in response to the received input signal.

The appearance of the character is controlled to encourage the user to perform desired behavioral responses according to the behavioral pattern rules. Alternatively, the feedback interface controls other devices such as a lock on a refrigerator or cigarette-dispensing box to have an effect on the behavioral pattern.

The present invention also solves the existing need by providing a system for helping users commit to improve their behaviors in daily life.

Furthermore, the present invention may provide an interactive computer implemented system, such as a site on the World Wide Web and wireless communication systems where simulated figures interact with users so that users can form desirable behavioral pattern in daily life. Each figure has unique "personality" and appearances.

Hereinafter, for purpose of description of the invention the term "character" will include appearances of figure, expression of its personality. Character's behavior is driven by adaptive algorithms that collects and analyzes user's daily life patterns. By comparing user's actual life pattern with user's personal goal, the algorithm will determine effective way to deeply interact with user so that user will form desirable life patterns to achieve personal goals.

A user may input a user profile to a remote server (a World Wide Web site) to store in the database the user's personal information (such as past and current behavioral patterns, goal and desired rate of change), which the algorithm of characters incorporates to give more personally tailored interaction with the user. Hereinafter, the term "project" is understood as a consistent series of activities that includes goal and start/end date.

The user also may optionally choose and download from the server to the user's communication device (such as handheld wireless devices, network appliances and personal computers) a character with algorithm that is designed for specific type of purpose such as decreasing smoking habit and sustaining desirable exercise pattern.

The user will customize the downloaded character to set finer personal preferences such as principle instructions of the character and detail touch of character behavior. After deep interactions with the user through a project engagement, the character will learn and evolve to have unique algorithms. The user will be able to save characters to exchange with other users or employ it in another project later.

The character interacts with the user wherever possible, for instance when the user is carrying handheld communication device on the road or when user happens to be using a network appliance (such as refrigerator) at home or at work. The character interacts with the user whenever the user initiates interaction and also when the algorithm determines crucial timings for prevention or encouragement of the user's behaviors.

According to the present invention, the algorithm of the character are adaptable to "memorize" the goal predetermined by the user, and maintains a projected success path (linear or non-linear curve) between start date and end date of the project period. The user enters the actions to the system through one of the devices that are registered at the server or the system automatically retrieves user's plans and activities. The frequency of the actions and degree (amount) of actions are tracked as a cumulative graph, which is the path that the user actually takes. The deviation of this user's path from the projected success path is monitored and recorded by either the server or the character algorithm.

According to the present invention, the character may show reaction when the user takes relevant actions. Depending on the type of action and degree (amount) of the action, the character encourages or discourages the user by simulating the user's current conditions. Also, before the user takes a particular action, the user can request a simulation of the action from the character, which will help the user to follow the projected success path. When the user does not take relevant actions for considerable length of time, the character alert the user to take actions (if desirable) or show gratification for not taking undesirable actions. The character expresses different background mood by degrees of the state of urgency and user's lack of response to engage life-like interaction with the user. The character algorithm memorizes the history of user's responses and grows to be unique personality so that the user can reutilize the character in another project more effectively and also the user can exchange the character with other users as a unique entity.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

A user-interactive behavioral modification system (10) for modifying undesired behavioral patterns includes a base module (12) with an input means (14) for inputting a first set of personal data (16) by a user into the base module (12). A feedback interface (18) provides feedback or operatively controls other modules or devices (20) in response to the first set of personal data (16).

A main database component (22) maintains the first set of personal data (16) entered into the base module (12). A main controller unit (24) generates a main output signal (26) for causing feedback (18) to the user (28) according to a predetermined set of behavioral pattern rules or algorithms (30). The feedback interface (18) receives a feedback input signal (32) and preferably includes a display unit (34) for displaying an appearance of a character (36) or other chosen visual representation having different appearances based on the first set of personal data and in response to the received output signal.

The appearance of the character (36) is controlled to encourage the user (28) to perform desired behavioral responses according to the behavioral pattern rules (30). Alternatively, the feedback interface (18) controls other devices (20) such as a lock on a refrigerator or cigarette-dispensing box to have an effect on the behavioral pattern.

Figure 1:
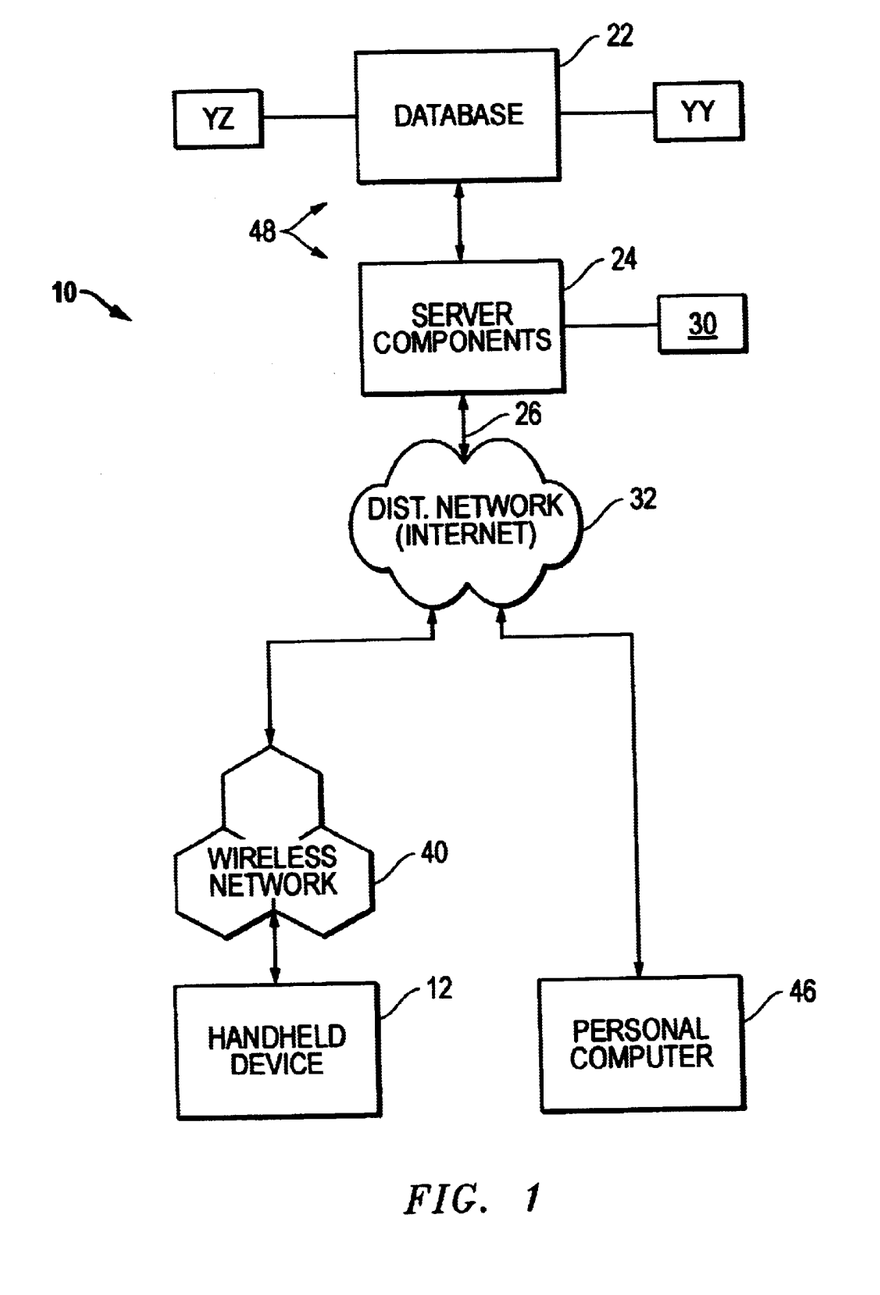
FIG. 1 is a block diagram illustrating a distributed network environment according to one preferred embodiment of the invention.

FIG. 1 illustrates a block diagram according to one preferred embodiment of the invention wherein the interactive system (10) is implemented over a distributed computer network (38) and a wireless network (40) of known types. While in the preferred embodiment the network (38) is the Internet and public wireless services, the invention is equally applicable to any distributed network and wireless network, whether public or private.

A database (22) contains information relating to templates for personality algorithms (42) and figure animations (44) as well as user-defined characters (combination of personality algorithm and figure animations). When a user (28) creates a new project, the user (28) enters user preferences, project definitions and user profiles in order to customize character (36). Then, the server components (24) modify a template character into tailored character. The user's handheld device (12) downloads the tailored character from database (22) via server components (24). The character data is sent from server component (24) over a known means for remotely coupling a base module to a central processor module, such as the Internet (38) and a wireless network (40). After starting a project, the character's algorithm keeps track of user's activities, either by means of interaction with the user's personal digital assistant applications (handheld devices and/or data at remote servers) or by means of user input. The character's interaction with the user (28) is done by its dynamic animations and sound effects on the handheld device or base module (12). The character's algorithm monitors user's activities and controls the character's (36) interaction with the user (28).

The predetermined set of behavioral pattern rules (30) are generally selected to assist the user (28) in reducing the incidence of undesired behaviors or can be chosen such that the user is encouraged to increase the occurrence of beneficial behaviors.

Alternatively, a known personal computer or similar (46) can contain the components of the base module (12) and provide additional functionalities.

Figure 2:
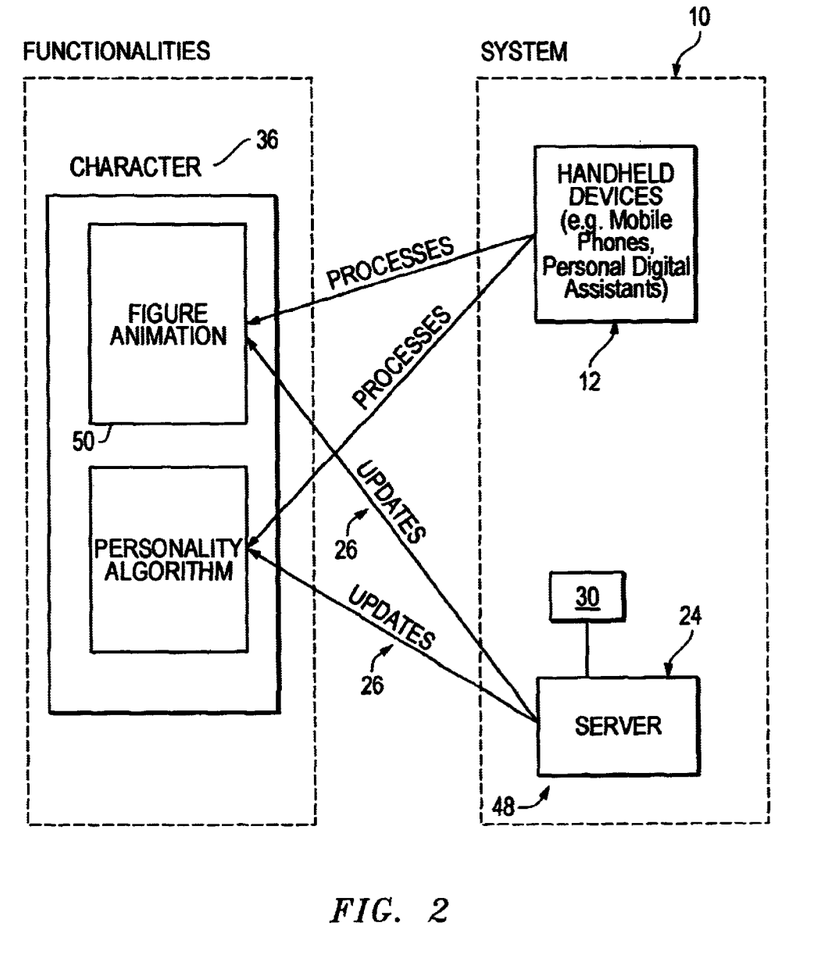
FIG. 2 is a diagram illustrating the elements of a simulated character and their corresponding system units.

FIG. 2 illustrates functional elements of the handheld or base module (12) and the base system components or central module unit (48) that support each element. The character's animations (50) are stored and executed at the handheld device or base module component (12) preferably including a base processor component (51). Also, the handheld device (12) desirably runs the character's algorithm that causes the character (36) to be animated.

When more complex processing is necessary for the character's algorithm to adapt to new situation, the handheld unit (12) requests update of the character algorithm from the server components (24). Also, more animations are downloaded from server components (24) whenever needed or desired and can be stored in a base memory module (62). The base memory module (62) maintains in a known storage device at least a subset of the information received from the main controller unit (48). The base processor (51) cooperates with the base memory module (62) and receives the feedback input signal (32) from the output (26) of the main controller unit (48) and further processes the signals. The feedback interface (18) thus responds to the output generated by the base module controller (51).

Preferably, the main database component (22) maintains a database of at least the first set of personal data (16) and a historical set of one or more previously stored sets of personal data. This provides a profile of the user (28) and the user's behaviors. The historical set of data improves the feedback characteristics of the system (10) to the user.

Figure 8:
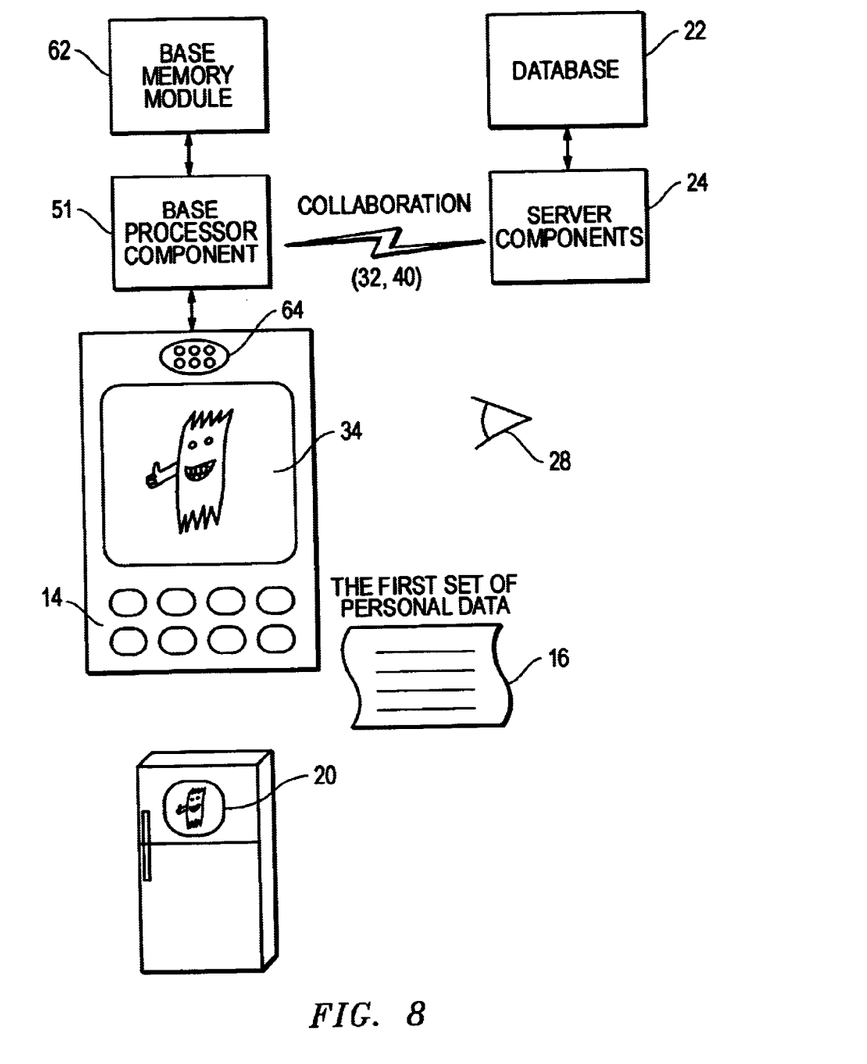
FIG. 8 shows a base module of the present invention and other controlled devices.

As described briefly above, alternatively, the feedback interface (18) may control one or more modules or other devices (20) to broaden the types of responses to the user (28) or actively manage aspects of the behavioral modification therapy. Examples are controls securing a refrigerator to lock and unlock the source of food at controlled times, or devices to administer medications. An alarm or alert system (64), such as a bell, whistle or other alerting system may be operatively attached or form a part of the feedback interface component (18).

The system of the present invention can alert the user (28) based on previously stored sets of personal data maintained in the main database component (22) or other chosen reasons. Alternatively, the system (10) can alert the user based on predetermined time events, such as previously established smoking or eating patterns, or based on a behavioral pattern of the user shown in the historical set of personal data sets in order to alert the user before the user actual does an undesired action like smoking.

Figure 3:
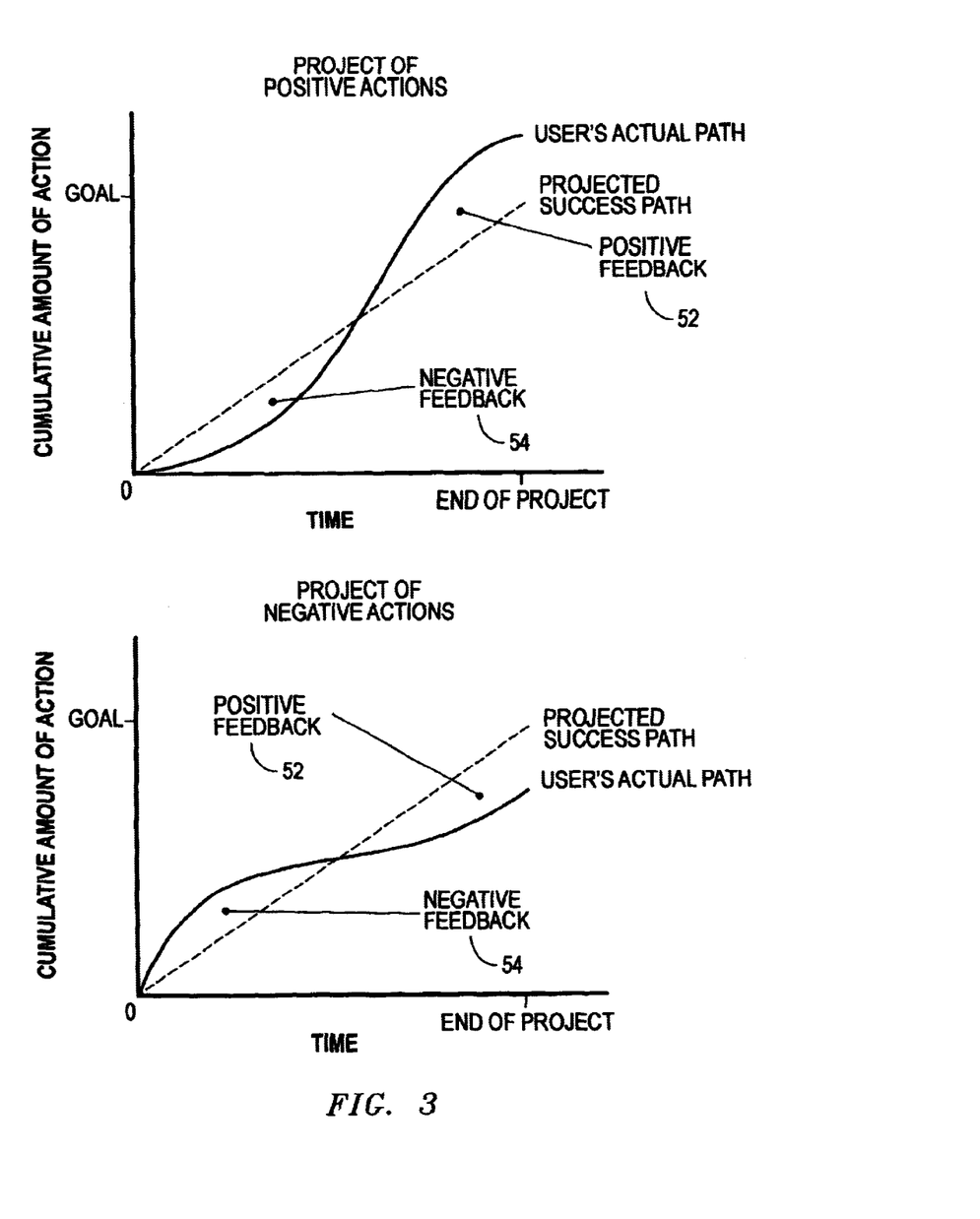
FIG. 3 is a chart illustrating relationship between the projected success path and the user's actual path.

FIG. 3 illustrates typical relationship between the projected success path and the user's actual path. In the case that targeted action is a positive (desirable), the character gives positive feedback (52) to the user when the user acts more than the projected success path. Conversely, the character (36) gives negative feedback to the user (28) when the user (28) acts less than the projected success path. In the case that targeted action is a negative (undesirable), the character gives negative feedback (54) to the user when the user acts more than the projected success path. Conversely, the character (36) gives positive feedback (52) to the user when the user acts less than the projected success path. The feedback of the character (36) varies by the degree of deviation of the user's actual path from the projected success path.

Figure 4:
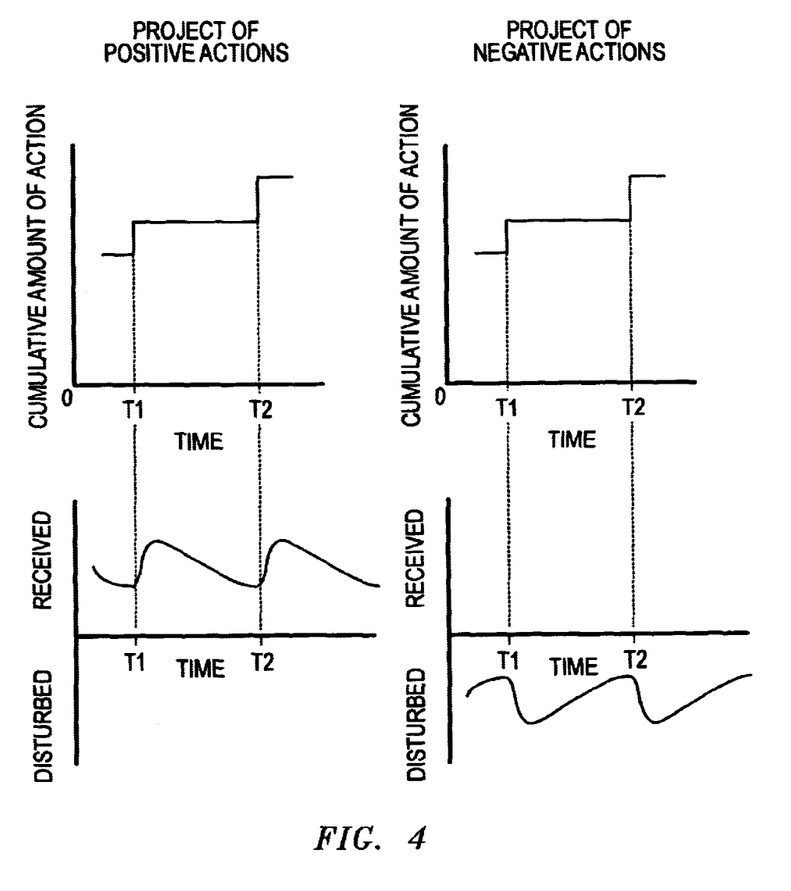
FIG. 4 is a chart illustrating impact of single user action.
Figure 7:
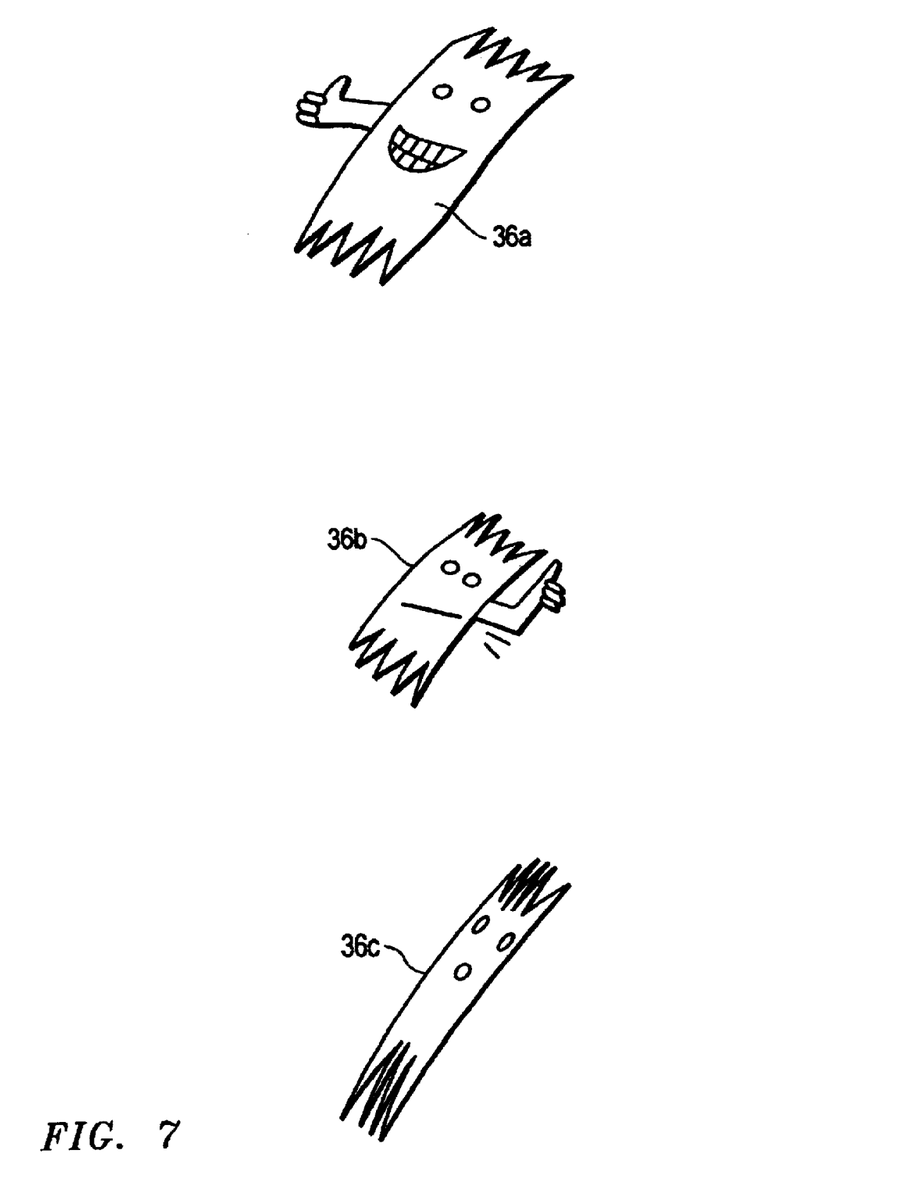
FIG. 7 is a depiction of a character with three possible appearances to give the user feedback for the present invention.

FIG. 4 illustrates the character's reaction to the user's action right after the moment or at the time of the first set of personal data (16) is input into the system (10). In the case that targeted action is a positive (desirable) action, the character (36) displays sense of relief upon user's action (see character 36a in FIG. 7 for example). When period of user's inaction becomes long, the character (36) displays sense of disturbance (frustration, weakness, etc.). In the case that targeted action is a negative (undesirable) action, the character displays sense of disturbance upon user's action (see character 36b in FIG. 7 for example). When period of user's inaction becomes long, the character displays sense of relief (happiness, wellness, etc.) (See character 36a in FIG. 7 for example). A neutral situation may produce the appearance of the character (36) as is shown as 36c in FIG. 7. However, overall appearance (animation and sound effects) of the character is combination of feedback by deviation from the projected success path and reaction upon user's actions.

Figure 5:
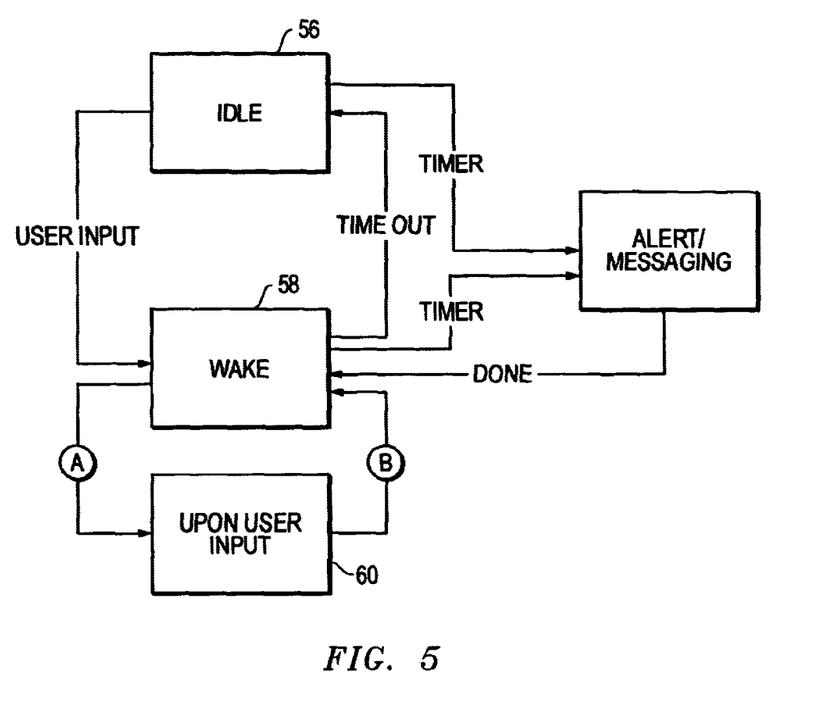
FIG. 5 is a diagram illustrating character behavior and situational factors.

In addition to feedbacks and reactions, the simulation of life-like character generates further complexity to the character's algorithm. FIG. 5 illustrates four distinctive states of the character (36) and conditions for transition between the states. The idle state (56) is a default state to which the character (36) falls into when nothing happens for certain length of time. When the user (28) does any operation upon the handheld device (12) or a new set of personal data (16) is input, the character (36) shifts or transitions to the wake state (58) and simulates paying attention to the user (28). The state upon user input (60) is the state when the character (36) needs more intense interaction with the user (28).

In the case that targeted action is a positive (desirable) action, when the period of user's inaction becomes unacceptable, the character (36) shifts to the state (60) along path (A), and initiates more intense interaction with the user through animations on the display (34) or other user interfaces such as beeps or other alerts. If the user (28) takes an appropriate action, then the character (36) displays a sense of relief (36a or 36c), and goes back to the wake state (58) along path (B).

In the case that targeted action is a negative (undesirable) action, when user (28) takes action, the character (36) shifts to the upon user input state (60) along path (A) and initiates more intense interaction through the feedback interface (18). If time passes without user taking further actions, then the character (36) displays a sense of relief (36a for example), and goes back to the wake state (58) along path (B). Also, the character's algorithm raises alerts (32) at certain time of day according to the user profile, or upon user's other relevant event.

Figure 5A:
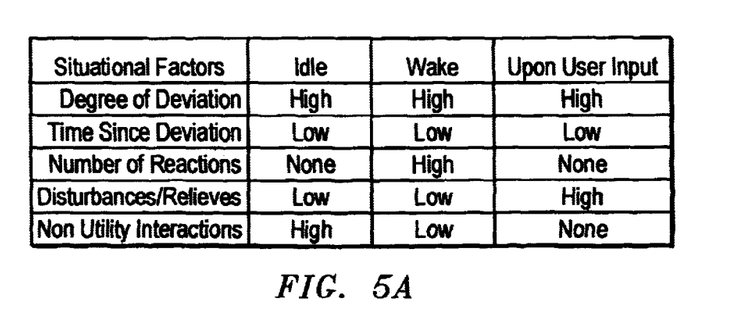

Also, the table of FIG. 5a illustrates correlations between each state and five distinctive situational factors. "Degree of deviation" determines amount of feedback. "Time since deviation" means the length of time that passed since last notable change of the deviation from the projected success path. This measurement is used to avoid monotony of the character behaviors. Number of reactions serves also the same purpose. "Disturbances/Relieves" is measurement for the character's reaction upon user's actions. "Non utility interaction" is a secondary interaction that is not directly related to the status of project, but that is to improve user's intimacy with the character.

Figure 6:
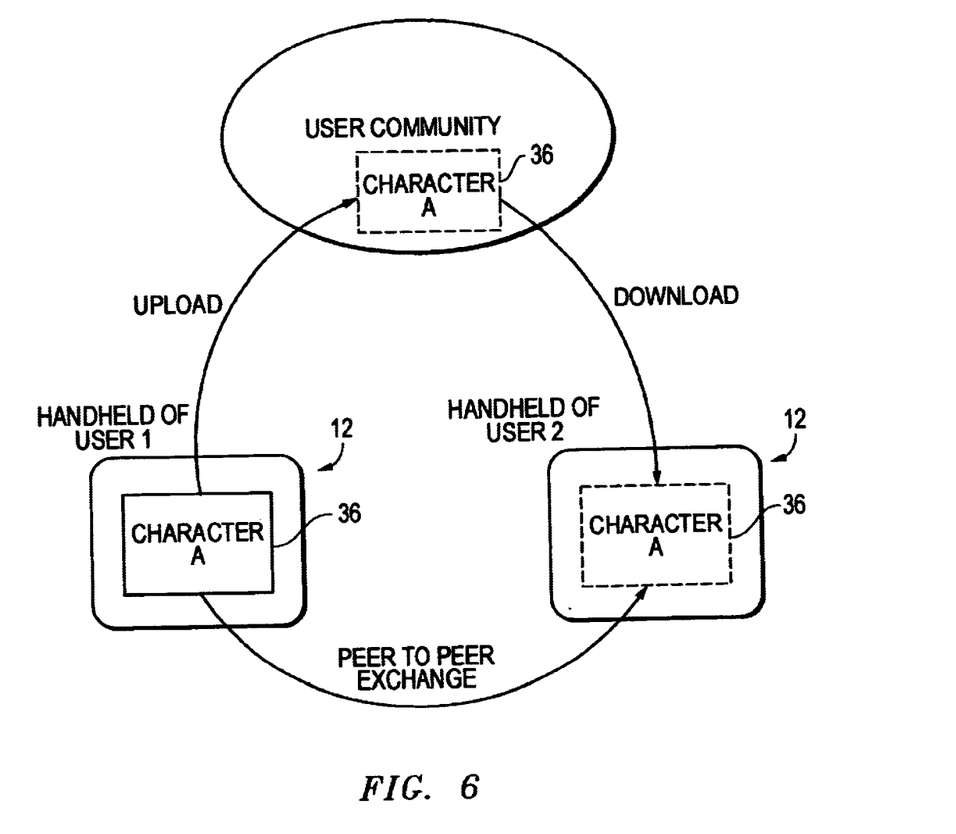
FIG. 6 is a schematic diagram showing the internetworking of users utilizing the present invention.

The way the user (28) interacts with the character (36) through the base module (12) modifies and further customizes the character's algorithm to the extent that the character (36) becomes unique through known neural net or other learning algorithmic means. After the project is finished, the user can store the character at the database (22) so that user (28) can employ the same character (36) for another project. Or, the user can share the character with other users. FIG. 6 illustrates how users can exchange characters. Users can post their character (36) at user community sites. Or, exchange with a particular user by directly sending the character to him or her.

An alternative embodiment of the present invention may include a simulation function. For instance, when a user is tempted by a bad habit or is reluctant to do a good deed, the user (28) can simulate the what-if scenarios by entering the hypothetical action into the system to see what response would be generated by the input. In such a simulation, the inputted personal data would be discarded rather than stored or forming a part of the database (22).

The method for modifying undesired behavioral patterns of the present invention includes the steps of inputting a first set of personal data (16) representative of a behavior by a user (28) into an input means (14) of a base module (12) responsive to input. The base module further includes at least one feedback interface (18) for providing a feedback input to the user (28) in response to the first set of personal data (16).

The first set of personal data (16) entered into the base module (12) is maintained in a main database component (22). A main output signal (26) for causing feedback to the user (28) is generated according to a predetermined set of behavioral pattern rules (30) by a main controller unit (24) operatively coupled to at least the main database component (22). A feedback input signal (32) is received by or in the feedback interface means (18) that in response displays an appearance of a character (36) having different appearances in a display unit (34) of the feedback means (18).

The appearance of the character (36) is displayed in response to the feedback input signal (32) such that the appearance of the character (36) is controlled to encourage the user (28) to perform desired behavioral responses according to the behavioral pattern rules and goals.

The present invention has the nature of a "pacemaker" by having the ability to set an ideal or preferred pace in lifestyle with the setting of an initial goal and length of period.

The foregoing disclosure and description of the invention are illustrative and explanatory thereof, and various changes in the size, shape and materials, as well as in the details of the illustrated construction may be made without departing from the spirit of the invention.

What is claimed is:

1. A user-interactive behavioral modification system for modifying undesired behavioral patterns comprising:
   an input means for inputting a first set of personal data by a user into a base module; the base module further including at least one feedback interface means for providing a feedback to the user in response to the first set of personal data;
   a main database component separated from the base module operative to maintain at least the first set of personal data entered into the base module;
   a main controller unit operatively coupled to at least the main database component for generating a main output signal for causing feedback to the user according to a predetermined set of behavioral pattern rules adapted for the user;
   a feedback signal is communicated to the feedback interface; the feedback interface means further includes a display unit for displaying an appearance of a character having different appearances based on the first set of personal data and in response to the input signal;
   whereby the appearance of the character is controlled to encourage the user to perform desired behavioral responses according to the behavioral pattern rules.

2. The system of claim 1 wherein the character is animated by a processor means in the base module.

3. The system of claim 1 further including remote coupling means for connecting the base module to a central module having the main controller unit and database component.

4. The system of claim 3 wherein the coupling means utilizes a wireless communications network.

5. The system of claim 1 wherein the base module further includes base module memory means for maintaining in a storage device at least a subset of information received from the main controller unit, and a base module controller connected to the base module memory and feedback means, and operative for receiving the output signal from the main controller unit and further processing the output signal; the feedback interface means responds to the output from the base module controller.

6. The system of claim 1 wherein the main database component maintains a database of at least the fist set of personal data and one or more previously stored sets of personal data.

7. The system of claim 1 wherein the feedback interface means further includes an alert system for alerting the user to an occurrence of an undesired behavioral pattern.

8. The system of claim 1 wherein the feedback interface means further includes an alert system for alerting the user based on previously stored sets of personal data maintained in the main database component.

9. The system of claim 1 wherein the predetermined set of behavioral pattern rules is selected to assist the user in reducing incidence of undesired behaviors.

10. The system of claim 1 wherein the predetermined set of behavioral pattern rules is selected to assist the user in enforcing occurrences of desired behaviors.

11. The system of claim 1 wherein the feedback interface means further includes an alert system for alerting the user based on predetermined time events.

12. A method for modifying undesired behavioral patterns comprising:
   inputting a first set of personal data representative of a behavior by a user into an input means responsive to input of a base module; the base module further including at least one feedback interface means for providing a feedback to the user in response to the first set of personal data;
   maintaining at least the first set of personal data entered into the base module in a main database component separated from the base module;
   generating a main output signal for causing feedback to the user according to a predetermined set of behavioral pattern rules by a main controller unit operatively coupled to at least the main database component; the behavioral pattern rules being adapted for the user;
   receiving a feedback signal in the feedback means;
   displaying an appearance of a character having different appearances in a display unit of the feedback means; the appearance of the character is displayed in response to the feedback signal;
whereby the appearance of the character is controlled to encourage the user to perform desired behavioral responses according to the behavioral pattern rules.

13. The method of claim 12 wherein the character is animated by a processor means in the base module.

14. The method of claim 12 further including remote coupling means for connecting the base module to a central module having the main controller unit and database component.

15. The method of claim 14 wherein the coupling means utilizes a wireless communications network.

16. The method of claim 12 wherein the base module further includes base module memory means for maintaining in a storage device at least a subset of information received from the main controller unit, and a base module controller connected to the base module memory and feedback means, and operative for receiving the output signal from the main controller unit and further processing the output signal; the feedback interface means responds to the output from the base module controller.

17. The method of claim 12 wherein the main database component maintains a database of at least the first set of personal data and one or more previously stored sets of personal data.

18. The method of claim 12 wherein the feedback interface means further includes an alert system for alerting the user to an occurrence of an undesired behavioral pattern.

19. The system of claim 12 wherein the feedback interface means further includes an alert system for alerting the user based on previously stored sets of personal data maintained in the main database component.

20. The system of claim 12 wherein the predetermined set of behavioral pattern rules is selected to assist the user in reducing incidence of undesired behaviors.

21. The system of claim 12 wherein the predetermined set of behavioral pattern rules is selected to assist the user in enforcing occurrences of desired behaviors.

22. The system of claim 12 wherein the feedback interface means further includes an alert system for alerting the user based on predetermined time events.

* * * * *